United States Patent Office 3,597,477
Patented Aug. 3, 1971

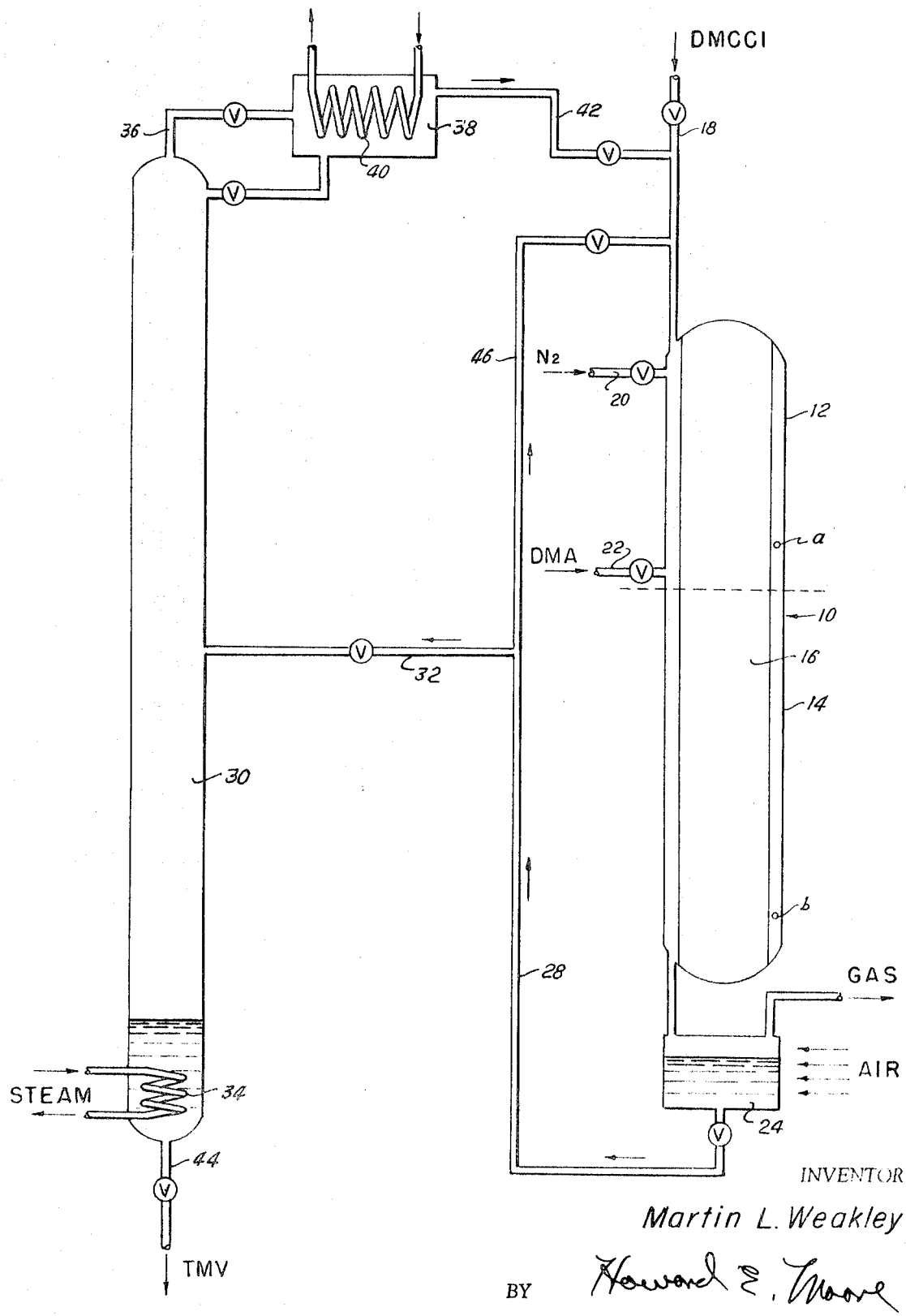

3,597,477
PROCESS FOR PREPARATION OF SUBSTITUTED UREAS
Martin L. Weakley, Pryor, Okla., assignor to Nipak, Inc., Dallas, Tex.
Filed Apr. 13, 1966, Ser. No. 542,364
Int. Cl. C07c *127/00*
U.S. Cl. 260—553
6 Claims

ABSTRACT OF THE DISCLOSURE

A process for producing alkyl substituted ureas, such as tetramethyl urea, by the reaction of an alkyl substituted carbamyl chloride, such as dimethylcarbamyl chloride, with an alkyl amine, such as dimethylamine, in which the reactants are heated to a vapor state; and continuously removing normally liquid urea product and unreacted carbamyl chloride by cooling.

---

The present invention relates to a process for the reaction of substituted carbamyl chloride with a compound having an active hydrogen atom. In a more specific aspect, the present invention relates to an improved process for reacting a substituted carbamyl chloride with a compound having an active hydrogen atom in the vapor phase.

Conventionally, the reaction of substituted carbamyl chlorides with compounds having an active hydrogen atom has been practiced by a variety of techniques. However, these techniques have been so cumbersome and require such delicate control that they have amounted to little more than laboratory curiosities.

For example, the classical method of preparing tetramethylurea has been to react N,N-dimethylcarbamyl chloride with dimethylamine in solution in an inert solvent. However, this technique produces substantial amounts of dimethylamine hydrochloride which not only increases the requirements of expensive dimethylamine but complicates further processing and makes it almost impossible to operate in a continuous manner. Since tetramethylurea is miscible with water in all proportions it is, therefore, most difficult to separate the tetramethylurea from the salts formed in the process. Of course, the inert solvent is usually not so inert as intended and, at best, presents its own problems of separation and product purification. It has been found also that if this liquid phase reaction is carried out without an inert solvent, the dimethylamine hydrochloride salt must be repeatedly filtered to effect its removal. Finally, considerable heat of reaction results from this vigorous reaction which is difficult to control in practice. Methods have also been developed for the reaction of dimethylcarbamyl chloride with trimethylamine to thereby produce methylchloride and restrict the production of dimethylamine hydrochloride. However, this reaction is extremely slow, and it cannot be readily utilized as a continuous process involving the reaction of phosgene and trimethylamine to produce the dimethylcarbamyl chloride followed by further conversion to tetramethylurea because of the much more rapid reaction which produces the substituted carbamyl chloride. For the same reason the trimethylamine route cannot be followed effectively in conjunction with a separate operation where dimethylcarbamyl chloride is produced from a substituted amine and phosgene with the separation of the dimethylcarbamyl chloride prior to its reaction with trimethylamine. Still another technique which also must be carried out in a batch-type operation, utilizes dimethylcarbamyl chloride with aqueous dimethylamine. Caustic is added to the liquid reactants to prevent the formation of dimethylamine hydrochloride. Recovery of the tetramethylurea in this case requires repeated solvent extraction with solvents, such as benzene, followed by distillation to remove the solvent and water.

It is therefore an object of the present invention to provide an improved process for the reaction of a substituted carbamyl chloride with a compound having an active hydrogen atom.

Another object of the present invention is to provide an improved process for the reaction of a substituted carbamyl chloride with a compound having an active hydrogen atom in the vapor phase.

Another and further object of the present invention is to provide an improved process for the preparation of substituted ureas.

Another and further object of the present invention is to provide an improved method for the preparation of substituted ureas by the reaction of a substituted carbamyl chloride with an amine.

Still another object of the present invention is to provide an improved process for the preparation of an alkyl substituted urea by the reaction of an alkyl substituted carbamyl chloride with an alkyl amine.

A further object of the present invention is to provide an improved process for the preparation of tetramethylurea by the reaction of N,N-dimethylcarbamyl chloride and dimethylamine.

Yet another object of the present invention is to provide an improved process for the preparation of substituted ureas by the reaction of a substituted carbamyl chloride with an amine in the vapor phase.

A still further object of the present invention is to provide an improved process for the preparation of alkyl substituted ureas by the reaction of an alkyl substituted carbamyl chloride with an alkyl substituted amine whereby the production of amine hydrochlorides is substantially reduced.

Another and further object of the present invention is to provide an improved process for the production of alkyl substituted ureas by the reaction of an alkyl substituted carbamyl chloride with an alkyl amine wherein substantially improved yields of the ureas are obtained.

A further object of the present invention is to provide an improved process for the preparation of alkyl substituted ureas by the reaction of alkyl substituted carbamyl chlorides with an alkyl amine wherein the alkyl amine is substantially all utilized in a production of ureas.

Yet another object of the present invention is to provide an improved process for the production of alkyl substituted ureas by the reaction of alkyl substituted carbamyl chlorides with alkyl amines wherein the heat of reaction is more readily controlled and is utilized to aid the reaction.

A still further object of the present invention is to provide an improved process for the preparation of alkyl substituted ureas by the reaction of alkyl substituted carbamyl chlorides with an alkyl amine wherein the urea product is readily separated from unreacted carbamyl chloride by simple distillation.

These and other objects and advantages of the present invention will be apparent from the following detailed description when read in conjunction with the drawing which illustrates an appropriate apparatus for carrying out the process.

In accordance with the present invention, it has been found that substituted carbamyl chlorides can be reacted with a compound having an active hydrogen atom by contacting these reactants in their vapor phase. The resultant product and unreacted carbamyl chloride can be recovered by condensation. The non-condensed gases can be removed at ambient conditions and the liquefied product distilled in a conventional manner to remove unreacted carbamyl chloride, which can then be recycled to the reaction zone. It has also been found possible to increase the conversion of carbamyl chloride by recycling at least a part of the liquefied product directly to the reactor prior to distillation. It has further been found that by utilizing less than the stoichiometric amount of the compound having an active hydrogen atom the production of by-product hydrochlorides can be further reduced.

Referring to the drawing, the method of the present invention will be explained with specific reference to the reaction of N,N-dimethylcarbamyl chloride and dimethylamine to produce tetramethylurea. An elongated column 10 is provided, which can be arbitrarily divided, as shown by the dashed line, into an upper preheater zone 12 and a lower reaction zone 14. So that preheater zone 12 and reaction zone 14 may be independently heated, the column 10 is provided with an appropriate heating jacket, such as by wrapping with a heating tape. A solid core 16 passes through the center of column 10 to thereby form an annular contact space in both preheater zone 12 and reaction zone 14. This expedient not only reduces the free space but also causes the materials to pass near the heated surface and be heated more efficiently and more evenly. Dimethylcarbamyl chloride, in the liquid state, is introduced at the top of preheater zone 12 through line 18. Gaseous nitrogen is also introduced adjacent the top of preheater section 12 through line 20. Gaseous dimethylamine is introduced at the bottom of the preheater zone 12 through line 22. As previously indicated, the temperature within column 10 is closely controlled so as to maintain the dimethylcarbamyl chloride and dimethylamine in the vapor state throughout the reaction. Accordingly, temperatures are measured and maintained as at point $a$ adjacent the bottom of preheater section 12 and point $b$ adjacent the bottom of reaction section 14. Typical temperatures at these points include temperatures of about 170° to 190° C. at a point $a$ in the preheater and about 210° to 310° C. at point $b$ in the reaction zone. Products of the reaction are collected in receiver 24, which is in open communication with the bottom of column 10. The tetramethylurea and unreacted dimethylcarbamyl chloride are recovered in receiver 24 by air cooling to condense these materials. Non-condensed gases may be vented to the atmosphere through line 26. Liquefied product is continuously removed from receiver 24 through line 28 and normally fed to distillation column 30 through line 32. Distillation column 30 is a conventional column appropriately heated by an internal coil 34, or other appropriate device. Vapors from column 30 are passed through line 36 to an appropriate condenser 38. Condenser 38 is cooled by an external cooling medium through the coil 40. Since the vapor from column 30 is substantially pure dimethylcarbamyl chloride this product is recycled to column 10 through line 42. Tetramethylurea product, containing extremely small amounts of dimetthylamine hydrochloride and minor amounts of water, is collected from the bottom of column 30 through line 44. If desired, the dimethylamine hydrochloride can be removed by filtering. However, since the content of this contaminant is so small it is not necessary that it be removed in some cases. Where it is desired to remove dimethylamine hydrochloride this can be readily done by a simple single stage filtering rather than having to resort to repeated filtering as is normally required when substantial amounts of the contaminant are present. As previously indicated, all or a part of the liquefied product stream from receiver 24 may be recycled to column 10. In doing so, however, care should be taken to control the amount of dimethylamine introduced to the column since the utilization of excessive amounts of dimethylamine has been found to result in the production of increased amounts of dimethylamine hydrochloride. As a matter of fact, it has been found in accordance with the present invention that rather than using stoichiometric volumes of dimethylamine and dimethylcarbamyl chloride, that is, one mole of dimethylcarbamyl chloride and two moles of dimethylamine, more complete utilization of the dimethylamine is effected and the production of dimethylamine hydrochloride is substantially diminished by employing about one mole of dimethylamine with one mole of dimethylcarbamyl chloride.

Any substituted carbamyl chloride capable of being vaporized below its decomposition temperature may be utilized herein. However, the di-substituted reactants are preferred since the other carbamyl chlorides require more severe conditions of reaction and more delicate control.

Suitable compounds having an active hydrogen atom which can be reacted with the carbamyl chloride, include; amines, to produce substituted ureas. Suitable amines include the lower dialkyl amines having from 1 to 5 carbon atoms in each alkyl group, such as dimethylamine, diethylamine, dibutyl amine, diamyl amine, etc. The utilization of amines other than those specifically referred to by the examples herein will require slightly different temperatures than those suggested, but the selection of such temperatures is within the purview of one skilled in the art.

The following specific examples of the present invention will illustrate the best mode of operation of the novel process as well as the many advantages of operating in accordance with this invention.

EXAMPLE I

The equipment for this run was constructed from an 18 mm. tube with the preheater section 36 cm. in length and the reaction section 56 cm. in length to give a reactor free space of about 20.8 cm.$^3$ when a solid 14 mm. rod was inserted. Over a period of 322 min., nitrogen was added at a rate of 12 to 13.5 ml. per min., dimethylamine was added at a rate of 246.5 ml. per min., and N,N-dimethylcarbamyl chloride was added at a rate of 1.03 g. per min. The preheater temperature was 170°–174° C. and the reactor temperature was 277°–287° C. A total of 331.8 g. (3.08 moles) of N,N-dimethylcarbamyl chloride and 159.4 g. (3.54 moles) of dimethylamine were added. The total gas flow was 7.71 ml per sec. to give a reactor residence time of about 2.7 sec. The product (374.1 g.) assayed 36.3% tetramethylurea, 56.7% N,N-dimethylcarbamyl chloride, 5.2% dimethylamine hydrochloride, and 0.26% water. The conversion of N,N-dimethylcarbamyl chloride was 36.1% (119.7 g. or 1.12 moles). The yield of tetramethylurea was 1.168 moles (135.8 g.) or 104.2% of theory, based on the converted N,N-dimethylcarbamyl chloride.

EXAMPLE II

Product from a previous example (36.3% TMU, 56.7% DMCCl) was pumped into the above mentioned equipment at 0.9 to 1.2 g. per min. and heated to 174° to 184° C. Dimethylamine was added at 0.5 g. per min. The reactor temperature varied between 275° and 297° C. due to difficult pumping conditions. The product contained 55.5% tetramethylurea and 16.1% N,N-dimethylcarbamyl chloride. Further conversion of N,N-dimethylcarbamyl chloride was achieved although the presence of excess dimethylamine did tie up much of the hydrogen chloride.

EXAMPLE III

A series of three runs was performed with the use of equipment constructed, as before, from a 14 mm. tube having a preheater section 40 cm. in length and a reaction section 50 cm. in length. A 7 mm. solid glass rod was inserted through the length of the tube. Liquid N,N-dimethylcarbamyl chloride was added at a rate of 0.84 to 1.0 ml. per min. while nitrogen was added at 45.3 ml. per min. and dimethylamine at 37.4 ml. per min. A residence time of about 20.1 sec. was achieved. Preheater and reactor temperatures and product compositions are noted in the following table.

TABLE 1.—EXPERIMENTAL RESULTS

| Run No. | Temp., °C. | | Product composition, percent | | | |
|---|---|---|---|---|---|---|
| | Pre-heater | Reactor | TMU | DMCCl | DMAHCl | HOH |
| 1 | 178–187 | 212–217 | 29.3 | 68.5 | 1.8 | 0.4 |
| 2 | 170–180 | 253–260 | 33.4 | 62.1 | 4.2 | 0.3 |
| 3 | 178–183 | 300–305 | 35.9 | 60.3 | 3.5 | 0.3 |

With increasing reactor temperature, more N,N-dimethylcarbamyl chloride was converted to tetramethylurea.

EXAMPLE IV

This run was performed in a manner similar to and in the same equipment as previously described in Example III. Over a period of 70 min., nitrogen was added at 16 ml. per min., dimethylamine at 0.44 to 0.46 g. per min., and N,N-dimethylcarbamyl chloride at 1.29 g. per min. A total of 31.9 g. (0.71 mole) of dimethylamine and 90.6 g. (0.84 mole) of N,N-dimethylcarbamyl chloride was added. The preheater temperature was 170° to 174° C. and the reactor temperature was 258° to 261° C. The product (125.9 g.) assayed 56.2% tetramethylurea, 27.2% N,N-dimethylcarbamyl chloride, 10.3% dimethylamine hydrochloride and 0.35% water. The yield of tetramethylurea was 72.3% based on the N,N-dimethylcarbamyl chloride feed.

The products of the present invention have a number of present and potential uses. For example, tetramethyl urea has been found to exhibit excellent solvent powers for plastic materials, such as cellulose esters, polyvinyl chloride, polyvinyl dicyanide, etc. Further, it may be used in a number of other areas where pyridine and tetrahydrofuran have heretofore been utilized, such as in water proofing and rubber compositions.

While specific examples have been given herein and specific techniques and conditions of operation suggested, it is to be understood that such examples and suggestions are directed to those skilled in the art and that numerous modifications and variations will occur to such skilled artisans.

I claim:
1. In a process for producing tetraalkyl urea by the reaction of a lower dialkyl amine having from 1 to 5 carbon atoms in each alkyl group and dimethyl carbamyl chloride, the improvement comprising, reacting said amine with said carbamyl chloride in the vapor phase while maintaining a temperature between about 210° C. and 310° C. and utilizing a mol ratio of said carbamyl chloride to said amine about 1 to 1, cooling the resultant product mixture to condense tetraalkyl urea and unreacted carbamyl chloride and removing the non-condensed gases and recovering the tetraalkyl urea from said resultant product mixture.

2. A process in accordance with claim 1 wherein the condensed tetraalkyl urea and unreacted carbamyl chloride is distilled to remove said unreacted carbamyl chloride from said tetraalkyl urea by vaporization of said carbamyl chloride.

3. A process in accordance with claim 2 wherein the removed unreacted carbamyl chloride is recycled to the contact zone.

4. A process in accordance with claim 1 wherein the reaction is conducted in an inert atmosphere.

5. A process in accordance with claim 1 wherein the reaction is conducted in a nitrogen atmosphere.

6. A process in accordance with claim 1 wherein the amine is dimethyl amine.

References Cited

UNITED STATES PATENTS

| 2,403,068 | 7/1946 | Franz et al. | 260—553A |
| 2,729,677 | 1/1956 | Gilbert et al. | 260—553 |
| 2,817,684 | 12/1957 | Bortnick | 260—553 |
| 2,993,930 | 7/1961 | Chappelow et al. | 260—553 |

FOREIGN PATENTS

| 811,681 | 4/1959 | Great Britain | 260—553 |

OTHER REFERENCES

The Van Nostrand Chemist's Dictionary, Van Nostrand Company, Inc., Princeton, N.J., June 1961, p. 493, QD5 V36.

Michler et al.: Berichte, volume 12 (1879) 1162–1164.

Van Gelderen, Recuel des Travaux Chimiques des Pays-Bas, vol. 52, pp. 996–8 (1933).

JOHN D. RANDOLPH, Primary Examiner

M. W. GLYNN, Assistant Examiner

U.S. Cl. X.R.

260—544